G. F. MEYER'S.
HOISTING APPARATUS.
APPLICATION FILED SEPT. 10, 1920.
1,427,310.
Patented Aug. 29, 1922.
3 SHEETS—SHEET 1.
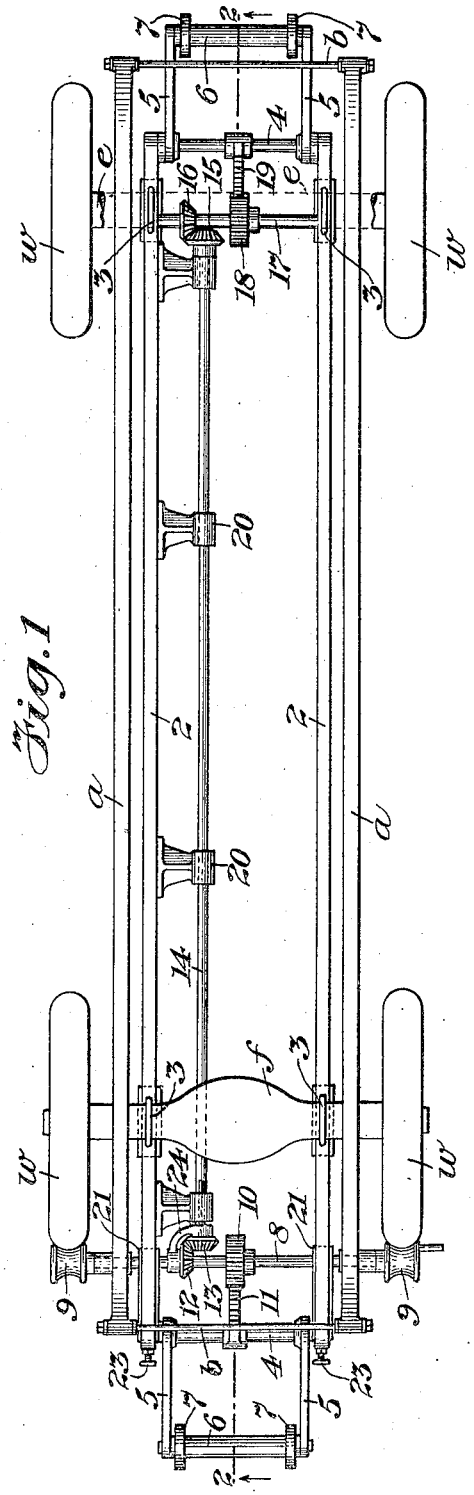
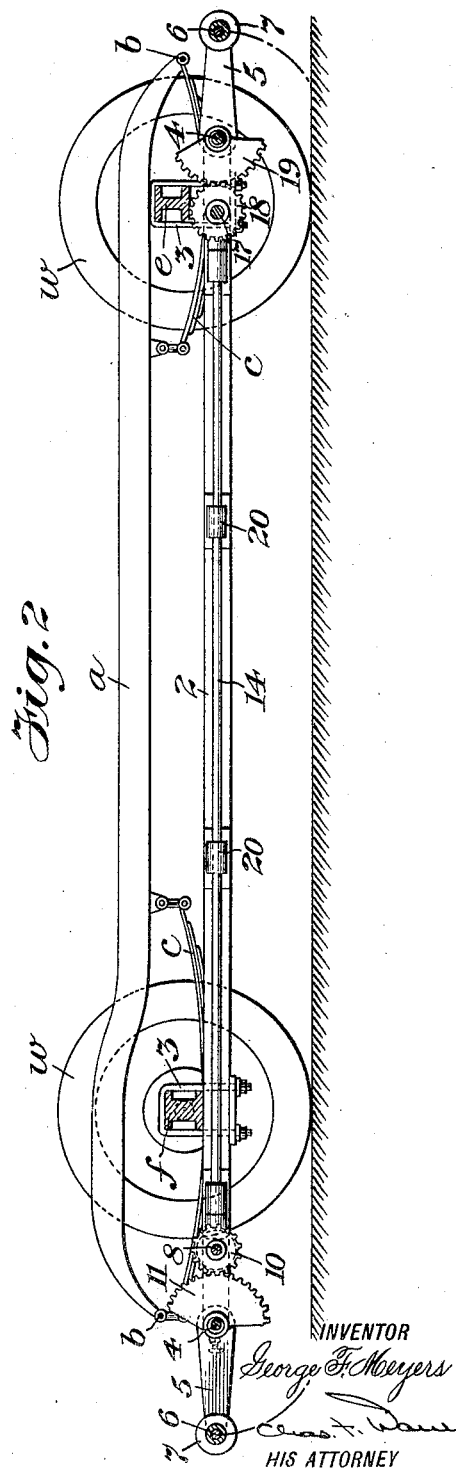
INVENTOR
George F. Meyers
HIS ATTORNEY G. F. MEYERS.
HOISTING APPARATUS.
APPLICATION FILED SEPT. 10, 1920.
1,427,310.
Patented Aug. 29, 1922.
3 SHEETS—SHEET 2.
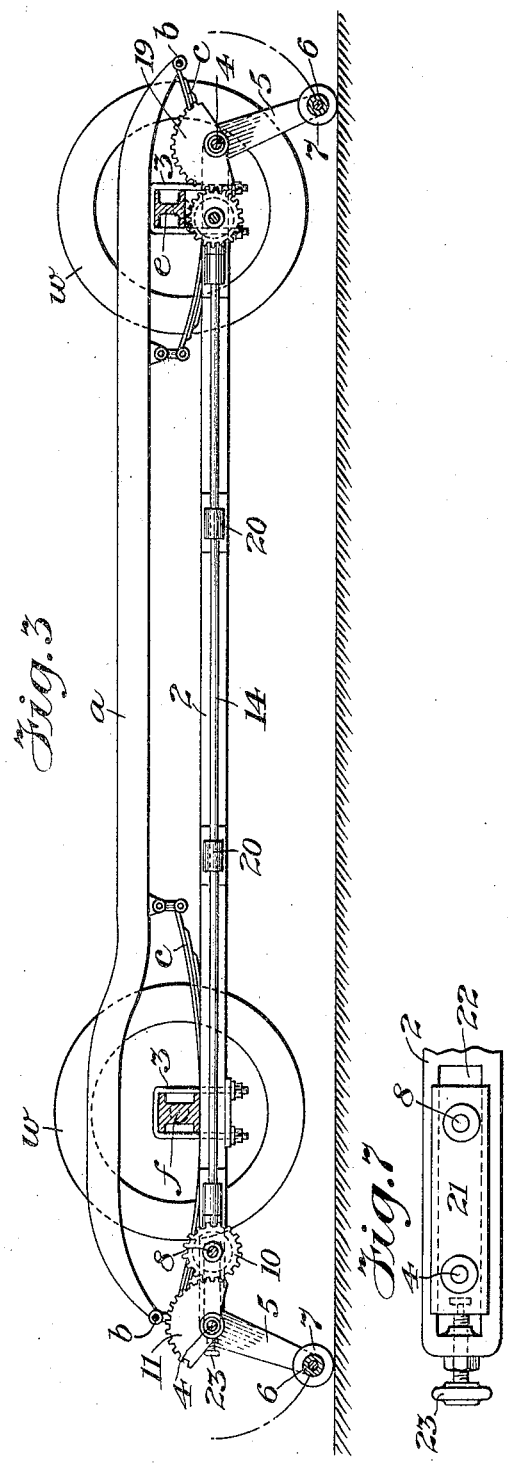
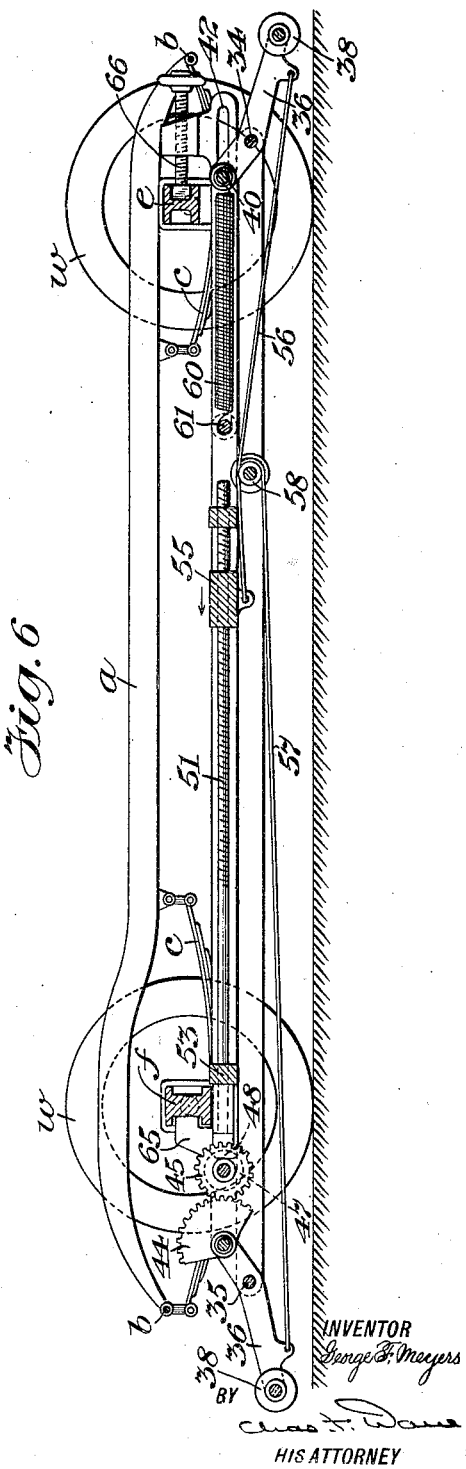
INVENTOR
George F. Meyers
BY
HIS ATTORNEY G. F. MEYERS.
HOISTING APPARATUS.
APPLICATION FILED SEPT. 10, 1920.
1,427,310.
Patented Aug. 29, 1922.
3 SHEETS—SHEET 3.
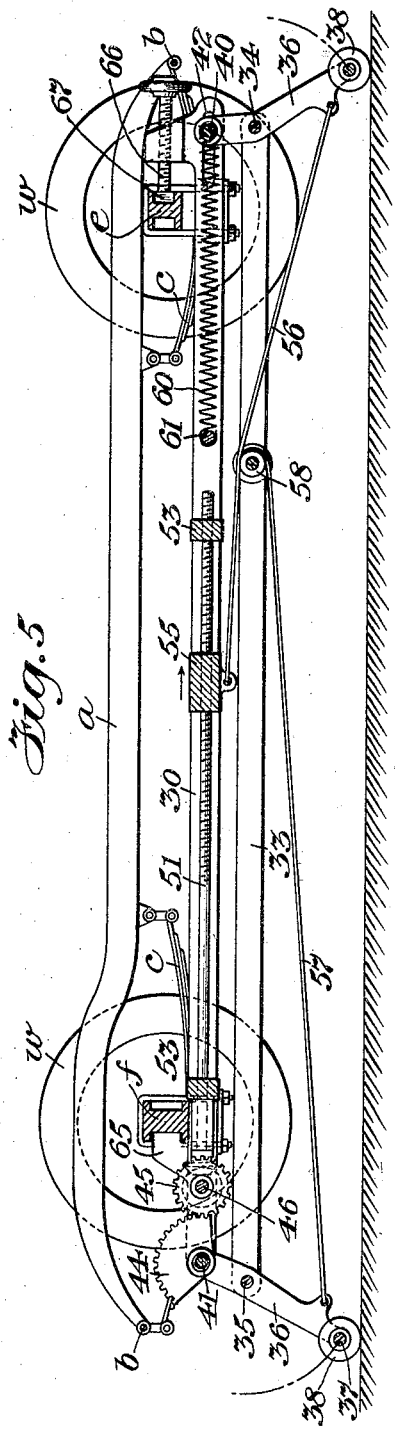
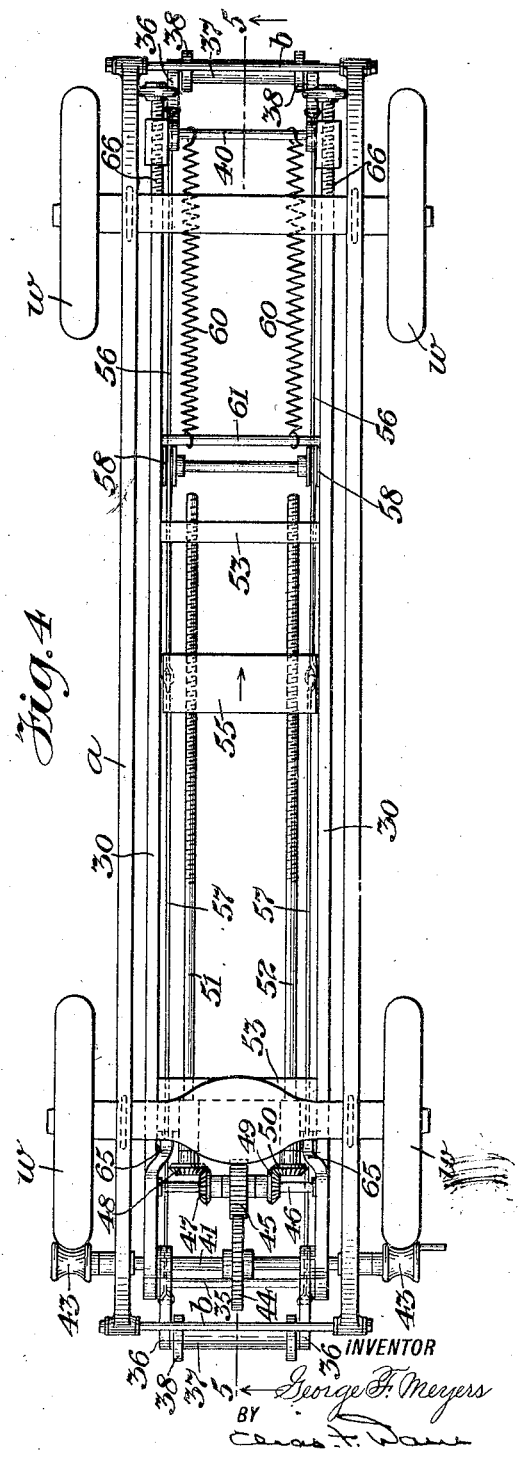
INVENTOR
George F. Meyers
BY
HIS ATTORNEY

UNITED STATES PATENT OFFICE.

GEORGE F. MEYERS, OF NEW YORK, N. Y.

HOISTING APPARATUS.

1,427,310.　　　　Specification of Letters Patent.　　Patented Aug. 29, 1922.

Application filed September 10, 1920. Serial No. 409,373.

*To all whom it may concern:*

Be it known that I, GEORGE F. MEYERS, a citizen of the United States, and resident of New York, in the county of New York and State of New York, have invented certain new and useful Improvements in Hoisting Apparatus, of which the following is a specification.

This invention relates to hoisting apparatus and has for its principal object to provide an improved hoisting apparatus for use in connection with automobiles that may be operated from the drive wheels of the automobile to be hoisted.

In carrying out my invention in a preferred form thereof, I provide an apparatus comprising a carrying frame for the support of the automobile when being hoisted, lifting members mounted on said frame adjacent opposite ends thereof for rocking movement in a vertical plane, a drive shaft mounted on the frame in position to be engaged and operated by the automobile drive wheels, and operative connections from said drive shaft to the lifting members for rocking the latter in a direction to raise or hoist the carrying frame and supported automobile. This apparatus may be incorporated in an automobile as a permanent part thereof, or it may be made up as a separate device for use only as occasion may require. In the first event the lifting members will preferably be so arranged that when swung to their inoperative positions they will extend beyond the opposite ends of the automobile and serve as bumpers therefor.

Referring now to the accompanying drawings illustrating my invention:—

Fig. 1 is a top plan view of an automobile chassis equipped with my improved hoisting apparatus as a permanent part thereof, the front axle being broken away to more clearly show the parts therebeneath and the lifting members at the opposite ends of the apparatus being shown as raised to their inoperative bumper-serving position.

Fig. 2 is a longitudinal section taken on the line 2—2 of Fig. 1.

Fig. 3 is a similar view showing the lifting members lowered to operative hoisting position.

Fig. 4 is a top plan view of an automobile chassis supported on a hoisting apparatus embodying a somewhat different form of the invention from that illustrated in the previous figures, the hoisting apparatus in this case being constructed as a complete unit separate from the automobile and the lifting members being shown in operative hoisting position.

Fig. 5 is a longitudinal section taken on line 5—5 of Fig. 4.

Fig. 6 is a similar view showing the apparatus in inoperative position with the automobile lowered, and Fig. 7 is an enlarged detail showing means for effecting driving connection between the drive wheels of the automobile and the drive shaft of the hoisting apparatus.

Similar reference characters indicate like parts in the several figures of the drawings.

The automobile chassis here shown is of usual construction, the same comprising the side frame members $a$, $a$, connected by end rods $b$, $b$, and carried by springs $c$, $c$, secured to the front and rear axles $e$, $f$, which latter are provided with the usual wheels $w$.

My improved hoisting apparatus, as shown in Figs. 1, 2 and 3, comprises a frame having two side members 2, 2, which extend substantially the full length of the chassis frame and are held to the under side of the axles by suitable fastening means, such as the clamps 3. Journaled in these side members 2, 2, at the opposite ends thereof are transverse shafts 4, 4, to which are attached the lifting members for rocking movement in a vertical plane. These lifting members, as here shown, each comprise a pair of arms 5, 5, rigidly attached to the shafts and carrying at their outer or free ends a rod 6 having rollers 7, 7, mounted thereon. When not in use, these lifting members will extend in a substantially horizontal position with their ends projecting beyond the adjacent ends of the automobile to serve as bumpers therefor, as shown in Figs. 1 and 2. When operated for the purpose of hoisting the automobile, however, they will be swung downward to bring the rollers 7 at their free ends into contact with the floor or other support, and then, when shifted towards a vertical position beneath the car, will act to raise the frame 2—2 and supported automobile as shown in Fig. 3. The length of the lifting members may of course be varied according to the height at which it is desired to hoist or elevate the automobile.

The lifting members may be operated by any suitable means. I prefer, however, to operate them from the drive wheels of the automobile. To do this, I mount a shaft 8 on the frame 2—2 adjacent the rear end thereof, which shaft projects at its ends beyond the sides of said frame and is provided with pulleys 9, 9, fixed thereto in position to be engaged and driven by the automobile drive wheels, as shown in Fig. 1. This drive shaft 8 is provided with a gear 10 fixed thereto which meshes with a larger segmental reducing gear 11 on the adjacent lifting member shaft 4. Thus by operating the automobile drive wheels in the proper direction, they will in turn operate the drive shaft 8 and cause this, through the gearing 10—11, to rock the adjacent lifting member from its inoperative position shown in Fig. 1, to its operative hoisting position shown in Fig. 3, or vice versa.

In order that the lifting member at the front end of the apparatus may be operated in unison with the one at the rear, just described, the drive shaft 8 is connected through bevel gearing 12—13 with a shaft 14 which extends lengthwise of the frame to a point adjacent the front end thereof, where it connects through bevel gearing 15—16 with a cross shaft 17, which latter is journaled in the frame 2—2 and connected through gearing 18—19 with the shaft 4 of the front end lifting member, as clearly shown in Fig. 1. Thus it will be understood that rotation of the drive shaft 8, as effected by the automobile drive wheels, will cause a simultaneous raising and lowering of the lifting members at the front and rear ends of the automobile. Journal brackets 20 attached to one of the frame members 2 provide a support for the longitudinal shaft 14 as shown. The drive shaft 8 with its pulley 9 is adapted to be adjusted to and from a position of driving engagement with the automobile drive wheels, and to provide for this I journal the ends of the drive shaft 8 and adjacent shaft 4 in journal boxes 21, 21, which are slidably mounted in elongated openings 22 in the opposite frame members 2, and adjusted by screws 23 mounted in the ends of said frame members, as best shown in Fig. 7. In order to maintain the gears 12 and 13 in mesh during such adjustment of the shaft 8 and associated parts, the gear 13 is suitably splined to the shaft 14 for sliding movement thereon and is connected to the gear 12 for adjusting movement therewith by means of a link bracket 24 loosely engaging the hubs of said gears as shown in Fig. 1.

The apparatus illustrated in Figs. 1, 2 and 3, is more particularly adapted for use in connection with light weight cars. For use in connection with heavier cars I prefer to employ the apparatus illustrated in Figs. 4, 5 and 6, wherein a power transmitting mechanism between the drive shaft and lifting members is employed which will increase the power transmitted from the drive shaft. In accordance with this construction, I provide upper and lower frames, the upper one corresponding to the carrying frame of the first apparatus and comprising a pair of longitudinal side members 30, 30, connected by suitable transverse tie rods, and the lower one comprising a pair of longitudinal side members 33, 33, arranged immediately beneath the side members of the upper frame and connected by transverse tie rods 34, 35. Connected with these frames at opposite ends thereof are lifting members similar in construction to those shown in Figs. 1, 2 and 3, each comprising a pair of side members 36, 36, carrying at their lower or free ends a cross rod 37, having rollers 38 mounted thereon. These lifting members are each fulcrumed at a point between their ends on the lower frame, by being mounted on the respective tie rods 34, 35 forming part of said frame, and at their upper ends are pivotally connected with the upper frame by connection with transverse shafts 40 and 41 mounted thereon, the shaft 40 at the front end of the apparatus having a sliding connection with the frame in longitudinal slots 42 therein, as shown in Figs. 5 and 6, in order to permit of a rocking movement of the lifting members about their fulcrum supports on the lower frame and a consequent raising and lowering of the upper or carrying frame.

The shaft 41 on the upper frame constitutes a drive shaft and is provided at its ends with pulleys 43, 43, corresponding with the pulleys 9, 9, of the first apparatus, which are adapted to be engaged and driven by the drive wheels of the automobile carried by the upper frame. This shaft 41 operates through gearing 44—45 to drive a counter shaft 46, which latter in turn operates through bevel gearing 47—48 and 49—50 to drive two screw rods or shafts 51 and 52 mounted in bearing blocks 53 extending between the opposite frame members 30, 30. Threaded on these screw shafts to be operated thereby, is a block 55 having connection with the opposite lifting members through cables 56 and 57, the cable 57 being passed over a pulley 58 on the lower frame whereby the block, when moved in one direction by its actuating screws, will act through said cables to draw the opposite lifting members from the inoperative positions shown in Fig. 6 to the operative hoisting position shown in Figs. 4 and 5.

As a means for returning the parts to their inoperative positions shown in Fig. 6 following the lowering of the car, springs 60 connect the rod 40 at the upper end of the front lifting member with a rod 61 on the upper frame and operate to swing said lifting member to a substantially horizontal position, thereby bringing the upper and lower frames together and at the same time causing the rear lifting member to be brought to a substantially horizontal position like that of the front member.

In order that the drive pulleys 43, 43, of the hoisting apparatus may be held to the automobile drive wheels with sufficient friction to be driven thereby, it is of course necessary that the carrying frame of the hoisting apparatus and the automobile should be secured in fixed relation during the raising and lowering operations. Any suitable connecting means may be employed for doing this. Such means in the present case comprise a pair of hook-like members 65, 65, on the carrying frame for engaging the rear axle of the automobile and a pair of screws 66, 66, carried on the front end of the carrying frame and having end blocks 67 for engaging the front axle of the automobile, as shown. These means permit of the hoisting apparatus being readily attached to and detached from the car as required.

While I have here described the apparatus embodying my invention as one particularly adapted for hoisting automobiles, it will of course be understood that it may be employed for the hoisting of other objects as well.

What I claim is:

1. An automobile hoisting apparatus comprising a carrying frame, lifting members mounted on said frame adjacent opposite ends thereof for rocking movement in a vertical plane, a drive shaft mounted on the frame in position to be engaged and operated by the automobile drive wheels, and operative connections between said shaft and the lifting members for rocking the latter in a direction to raise the carrying frame and supported automobile.

2. In combination with an automobile having the usual drive member, of a hoisting apparatus therefor comprising a carrying frame, a lifting member pivotally mounted on said carrying frame for rocking movement in a vertical plane, and operative means between the automobile drive member and said lifting member for rocking the latter in a direction to either raise or lower the carrying frame and supported automobile.

3. In combination with an automobile having the usual drive member, of a hoisting apparatus therefor comprising a carrying frame, means for detachably holding the latter frame in fixed relation with the automobile, a lifting member pivotally mounted on said carrying frame for rocking movement in a vertical plane, and operative connections between the automobile drive member and said lifting member for rocking the latter in a direction to either raise or lower the carrying frame and supported automobile.

4. In combination with an automobile having the usual drive wheels, of a hoisting apparatus therefor comprising a carrying frame, a drive shaft mounted thereon in position to be engaged and operated by the automobile drive wheels, means for holding said drive shaft in operative relation with the automobile drive wheels, lifting members pivotally mounted on the carrying frame for rocking movement in a vertical plane, and operative connections between the drive shaft and said lifting members for rocking the latter in a direction to either raise or lower the carrying frame and supported automobile.

5. In combination with an automobile having the usual chassis frame and drive wheels, of a hoisting apparatus therefor comprising a carrying frame, means for holding the latter frame in fixed relation with the chassis frame, a drive shaft mounted in the carrying frame, means for operating said drive shaft from the automobile drive wheels, lifting members mounted on said carrying frame adjacent opposite ends thereof for rocking movement in a vertical plane, and operative connections between said shaft and the lifting members for rocking the latter in a direction to either raise or lower the carrying frame and supported automobile.

6. In combination with an automobile having the usual chassis frame and drive wheels, of a hoisting apparatus therefor comprising a carrying frame, means for holding the latter frame in fixed relation with the chassis frame, a drive shaft mounted in the carrying frame, means for adjusting said drive shaft to and from a position of driving engagement with the automobile drive wheels, lifting members mounted on said carrying frame adjacent opposite ends thereof for rocking movement in a vertical plane, and operative connections between the drive shaft and said lifting members for rocking the latter in a direction to either raise or lower the carrying frame and supported automobile.

7. An automobile hoisting apparatus comprising a carrying frame, a drive shaft mounted thereon in position to be engaged and operated by the automobile drive wheels, a lifting member pivotally mounted on said frame for rocking movement in a vertical plane, and operative connections between the drive shaft and said lifting member for rocking the latter in a direction to raise the carrying frame and supported automobile, said lifting member being arranged when in inoperative position to project beyond the adjacent end of the automobile to serve as a bumper therefor.

8. A hoisting apparatus comprising a carrying frame, a drive shaft and a lifting member both mounted on said frame, the lifting member mounted for rocking movement in a vertical plane, and operative connections between the drive shaft and lifting member for rocking the latter in a direction to raise the connected carrying frame, said connections comprising a pulling cable connected with the lifting member and operated from the drive shaft.

9. A hoisting apparatus comprising a carrying frame, a drive shaft and a lifting member both mounted on said frame, the lifting member being mounted for rocking movement in a vertical plane, and operative connections between the drive shaft and lifting member for rocking the latter in a direction to raise the connected carrying frame, said connections comprising a screw shaft, a block threaded on said shaft to be operated thereby, and a cable connecting said block with the lifting member for raising the latter to lifting position.

10. A hoisting apparatus comprising a carrying frame, a drive shaft and a counter shaft both mounted on said frame and having a geared connection, an endwise stationary screw shaft driven from said counter shaft, a block threaded on said screw shaft to be operated thereby, lifting members mounted on said frame adjacent opposite ends thereof for rocking movement in a vertical plane, and cables connecting said screw block with the lifting members for raising the latter to lifting position.

11. An automobile hoisting apparatus comprising upper and lower frames, means on the upper frame for attaching the same to the automobile frame, lifting members pivotally connected at different points in their length with both said upper and lower frames for rocking movement in a vertical plane, a drive shaft mounted in the upper frame to be engaged and operated by the automobile drive wheels, and operative connections between said drive shaft and the lifting members for rocking the latter in a direction to raise the upper frame and connected automobile.

12. An automobile hoisting apparatus comprising upper and lower frames, means on the upper frame for attaching the same to the automobile frame, lifting members pivotally connected at different points in their length with both said upper and lower frames for rocking movement in a vertical plane, a drive shaft mounted in the upper frame to be engaged and operated by the automobile drive wheels, an endwise stationary screw shaft also mounted on the upper frame and connected with the drive shaft to be actuated thereby, a block threaded on said shaft to be operated thereby, and a cable connecting said block with the lifting members for rocking the latter in a direction to raise the upper frame and connected automobile.

Signed at New York, in the county of New York, and State of New York, this 30th day of August, A. D. 1920.

GEORGE F. MEYERS.